(12) United States Patent
An et al.

(10) Patent No.: US 10,259,428 B2
(45) Date of Patent: Apr. 16, 2019

(54) WIPER BLADE

(71) Applicant: KCW Corporation, Daegu (KR)

(72) Inventors: Jae-hyuck An, Daegu (KR); Seung Hun Nam, Daegu (KR)

(73) Assignee: KBWS Corporation, Daegu (KR)

( * ) Notice: Subject to any disclaimer, the term of this patent is extended or adjusted under 35 U.S.C. 154(b) by 202 days.

(21) Appl. No.: 14/964,389

(22) Filed: Dec. 9, 2015

(65) Prior Publication Data

US 2016/0167622 A1     Jun. 16, 2016

(30) Foreign Application Priority Data

Dec. 11, 2014   (KR) .......................... 10-2014-0178588

(51) Int. Cl.
*B60S 1/38*     (2006.01)

(52) U.S. Cl.
CPC ........... *B60S 1/3806* (2013.01); *B60S 1/3801* (2013.01)

(58) Field of Classification Search
CPC ............................. B60S 1/3806; B60S 1/3801
USPC .................................................... 15/250.201
See application file for complete search history.

(56) References Cited

U.S. PATENT DOCUMENTS

| | | | | |
|---|---|---|---|---|
| 5,383,249 A | * | 1/1995 | Yang | B60S 1/3801 15/250.201 |
| 5,946,764 A | * | 9/1999 | Tworzydlo | B60S 1/3806 15/250.201 |
| 2013/0139344 A1 | * | 6/2013 | Kim | B60S 1/0408 15/250.201 |
| 2013/0152325 A1 | * | 6/2013 | Oslizlo | B60S 1/3801 15/250.32 |
| 2013/0305479 A1 | * | 11/2013 | Kim | B60S 1/3801 15/250.453 |
| 2013/0312210 A1 | | 11/2013 | Kim et al. | |
| 2014/0053361 A1 | * | 2/2014 | Amano | B60S 1/3801 15/250.453 |

(Continued)

FOREIGN PATENT DOCUMENTS

| | | |
|---|---|---|
| CN | 103085767 | 5/2013 |
| CN | 103129526 A | 6/2013 |

(Continued)

OTHER PUBLICATIONS

Office Action for Japanese Patent Application No. JP 2015-240994, dated Nov. 29, 2016, 3 Pages, (With Concise Explanation of Relevance).

(Continued)

*Primary Examiner* — Andrew A Horton
(74) *Attorney, Agent, or Firm* — Fenwick & West LLP (57) ABSTRACT

A wiper blade which is coupled to a vehicle and wipes a glass surface of the vehicle may be provided. The wiper blade includes: a main lever which is connected to a wiper arm; a pair of auxiliary levers 300 which are coupled to the main lever in such a manner as to perform a relative rotation with the main lever; at least one pair of yoke levers which are coupled to the pair of auxiliary levers respectively in such a manner as to perform a relative rotation with the auxiliary lever; and a wiper strip which is supported by the at least one pair of yoke levers. The pair of auxiliary levers includes a first side fin which is formed on at least a portion of the rear side of the auxiliary lever and is integrally formed with each of the pair of auxiliary levers.

3 Claims, 7 Drawing Sheets

(56) References Cited

U.S. PATENT DOCUMENTS

2014/0109336 A1* 4/2014 Song .................. B60S 1/3801
15/250.453

FOREIGN PATENT DOCUMENTS

| | | |
|---|---|---|
| CN | 103287396 | 9/2013 |
| JP | 1993-193452 A | 8/1993 |
| JP | 2009-202699 A | 9/2009 |
| JP | 2010-083475 A | 4/2010 |
| JP | 2012-136149 A | 7/2012 |
| JP | 2013-075543 A | 4/2013 |
| KR | 10-2013-0049566 A | 5/2013 |
| WO | WO 2014-003364 A1 | 1/2014 |

OTHER PUBLICATIONS

Office Action for Korean Patent Application No. KR 10-2014-0178588, dated Apr. 20, 2016, 5 Pages, (With Concise Explanation of Relevance).

First Office Action for Chinese Patent Application No. CN 201510915585.4, dated Aug. 1, 2017, 10 Pages (With English Translation).

Second Office Action for Chinese Patent Application No. CN 201510915585.4, dated Feb. 24, 2018, 6 Pages (With Concise Explanation of Relevance).

* cited by examiner

WIPER BLADE

CROSS-REFERENCE TO RELATED APPLICATION

This application claims priority under 35 U.S.C. § 119(a) to Republic of Korea Patent Application No. 10-2014-0178588 filed on Dec. 11, 2014, which is incorporated by reference herein in its entirety.

BACKGROUND

Field

The present invention relates to a wiper blade, and more particularly to a wiper blade for a vehicle.

Description of Related Art

In general, a wiper blade removes impurities, snow, rain or the like when driving and prevents a driver's front sight from being deteriorated. In a conventional wiper blade, as a motor drives a link apparatus connected to a wiper arm, the wiper blade performs a repetitive reciprocating action in a fan shape.

In this wiper blade, since the curvatures of glass surfaces of vehicles are various respectively, it is important to prevent the wiper blade from lifting according to the curvature. Therefore, a fin is formed concave on a portion of a front side of a general wiper blade and distributes a traveling wind toward the front of the vehicle to an end of the wiper blade.

Also, in the conventional wiper blade, the upper edge on which the fin has been formed becomes lower toward the end of the wiper blade. Therefore, a pressing force to a wiper strip by the traveling wind becomes smaller toward the end of the wiper blade.

SUMMARY

One embodiment is a wiper blade which is coupled to a vehicle and wipes a glass surface of the vehicle. The wiper blade includes: a main lever which is connected to a wiper arm; a pair of auxiliary levers which are coupled to the main lever in such a manner as to perform a relative rotation with the main lever; at least one pair of yoke levers which are coupled to the pair of auxiliary levers respectively in such a manner as to perform a relative rotation with the auxiliary lever; and a wiper strip which is supported by the at least one pair of yoke levers. The pair of auxiliary levers includes a first side fin which is formed on at least a portion of a rear side of the auxiliary lever and is integrally formed with each of the pair of auxiliary levers.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, exemplary embodiments of the present invention will be described in detail with reference to the accompanying drawings in order that the present invention may be easily implemented by those skilled in the art.

<An Overall Configuration of a Wiper Blade Assembly According To the Present Invention>

Figure 1:
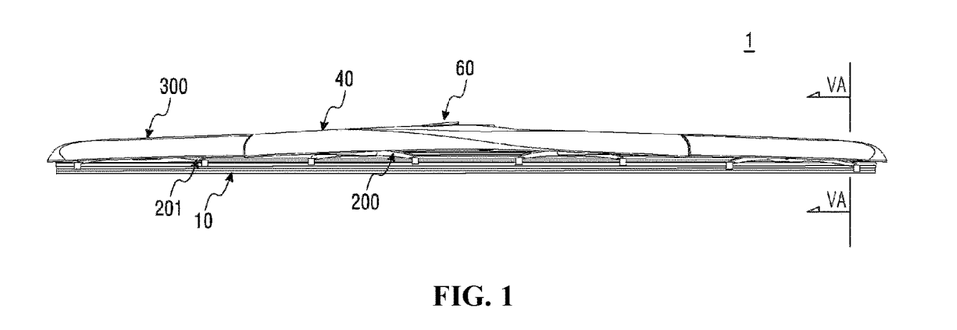
FIG. 1 is a front view of a wiper blade according to an embodiment of the present invention.
Figure 2:
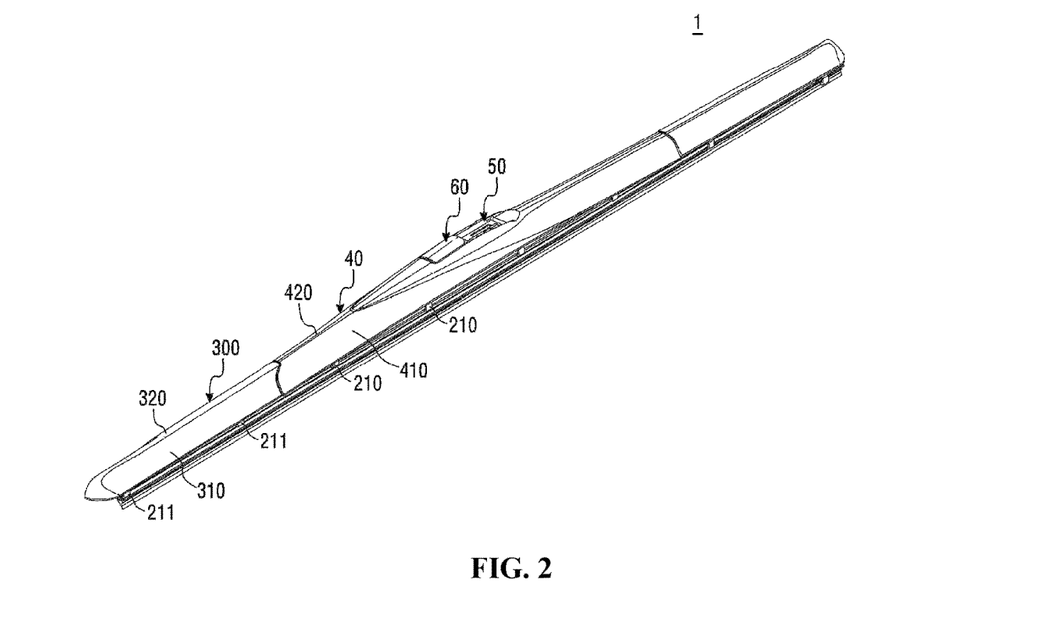
FIG. 2 is a perspective view of the wiper blade according to the embodiment of the present invention.
Figure 3:
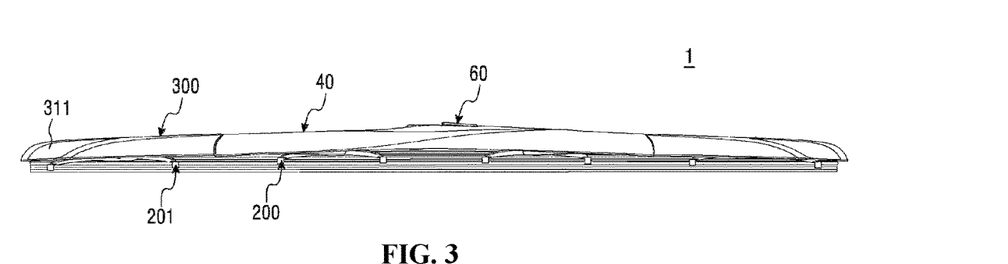
FIG. 3 is a rear view of the wiper blade according to the embodiment of the present invention.
Figure 4:
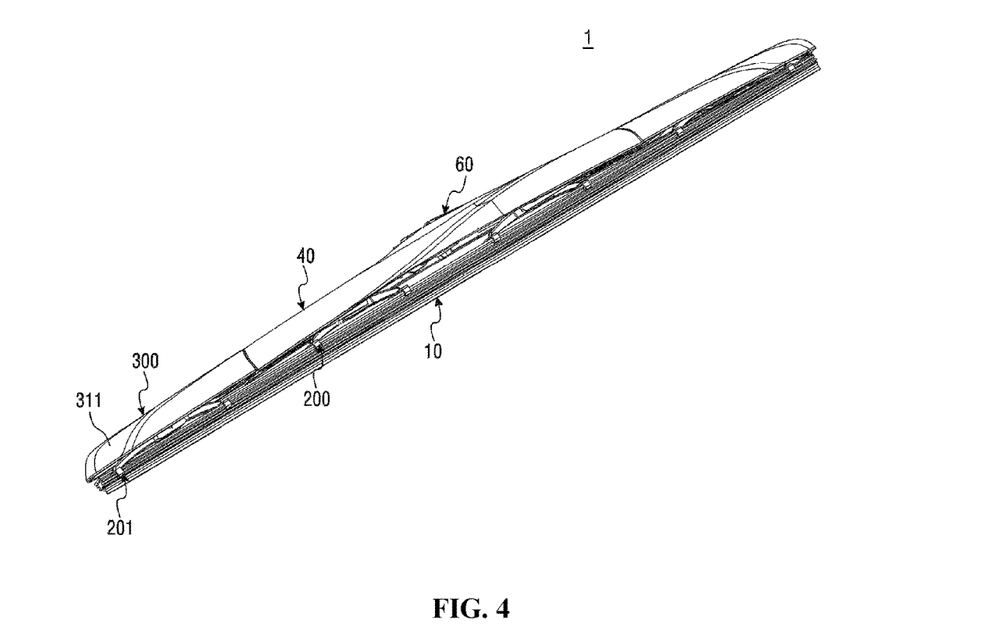
FIG. 4 is a rear perspective view of the wiper blade according to the embodiment of the present invention.

FIG. 1 is a front view of a wiper blade according to an embodiment of the present invention. FIG. 2 is a perspective view of the wiper blade according to the embodiment of the present invention. FIG. 3 is a rear view of the wiper blade according to the embodiment of the present invention. FIG. 4 is a rear perspective view of the wiper blade according to the embodiment of the present invention.

Referring to FIGS. 1 to 4, a wiper blade 1 according to the embodiment of the present invention may include a wiper strip 10, a pair of first yoke levers 200 which are disposed in the central portion of the wiper blade 1, a pair of second yoke levers 201 which are disposed on an end of the wiper blade 1, a pair of auxiliary levers 300, and a main lever 40.

Hereafter, the wiper blade shown in FIGS. 1 to 4 will be described in detail.

As shown in FIGS. 1 to 4, the wiper blade 1 according to an embodiment of the present invention is connected to an end of a wiper arm and receives a pressing force from the wiper arm in a direction of a glass surface of a vehicle. The wiper arm rotates reciprocatively at a predetermined angle by a wiper motor (not shown). Accordingly, the wiper blade 1 wipes the glass surface (wiping surface) of the vehicle within the predetermined angle.

Figure 5A:
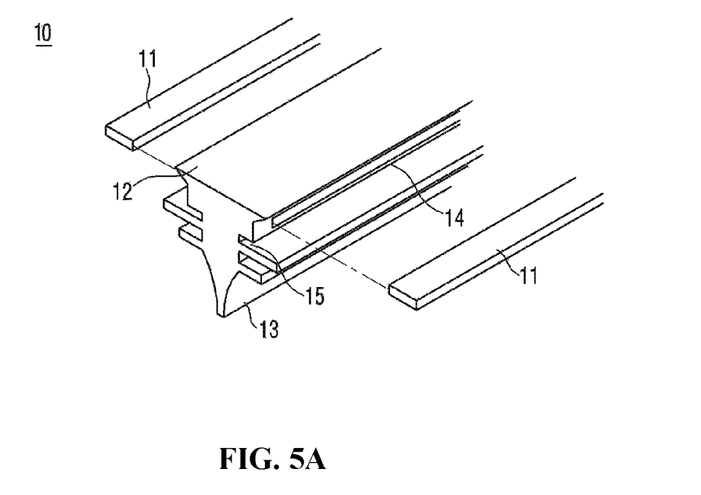
FIG. 5a is a perspective view of an end of a wiper strip according to the embodiment of the present invention.
Figure 5B:
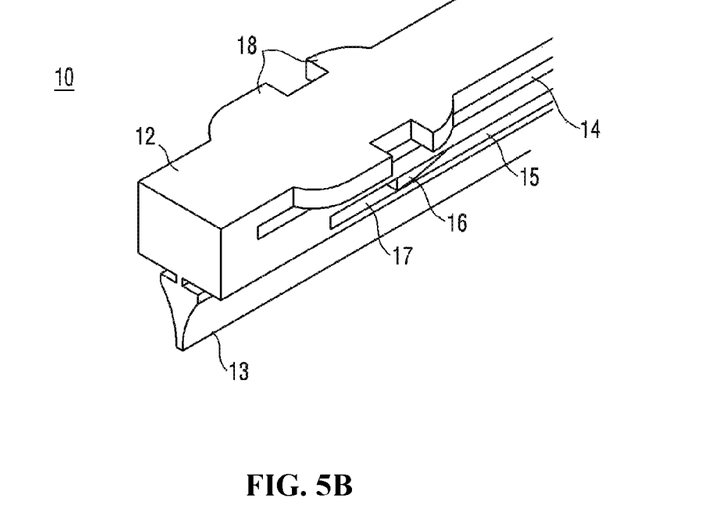
FIG. 5b is a perspective view of the other end of the wiper strip according to the embodiment of the present invention.

FIGS. 5a and 5b are partial perspective views showing respectively one and the other ends of the wiper strip.

Referring to FIGS. 1 to 5b, the wiper blade 1 further includes two backing plates 11 mounted on the wiper strip 10.

As shown in FIGS. 1 to 5b, the wiper strip 10 includes a wiping lip 13 and a base 12. The wiping lip 13 contacts directly with and wipes the glass surface. The base 12 is supported by the yoke lever 20 and the auxiliary lever 30. The wiper strip 10 is disposed to contact with the glass surface of the vehicle in a sliding manner and removes foreign substances on the glass surface. The wiper strip 10 extends in a longitudinal direction thereof and is made of either an elastic material like rubber or an elastic composite material.

The base 12 is supported by yokes of the first and second yoke levers 200 and 201. The yokes may have a yoke shape. The base 12 and the wiping lip 13 continuously extend in a longitudinal direction of the wiper strip 10. A receiving recess 14 in which the two parallel backing plates 11 can be received extends in the base 12 in a longitudinal direction thereof. The two rectangular metallic backing plates 11 having spring characteristics are received in the two backing plate receiving recesses 14 respectively. A holding portion 15 receives the yoke in a sliding manner.

As shown in FIG. 5a, the holding portion 15 located at one end of the wiper strip 10 is open so as to receive the yoke. However, as shown in FIG. 5b, the other end of the wiper strip 10 is formed to limit the longitudinal movement of the yoke of any one of the second yoke levers 201. That is, the yoke supporting the other end is limited by a coupler 17 and a wall of a slope 16 provided only at the other end of the holding portion 15. Also, the longitudinal movement of the yoke is limited by a protrusion 18.

The backing plate 11 applies elasticity and rigidity to the wiping lip 13. When a pressing force is applied from the wiper arm, the pressing force is distributed to the wiper strip 10 through the levers. Here, the pressing force is distributed by the backing plate 11 in the longitudinal direction of the wiper strip 10. Accordingly, the backing plate 11 should have elasticity and rigidity to maintain the shape of the wiper strip 10. A plurality of the backing plates 11 and a plurality of the backing plate receiving recesses 14 may be provided according to the rigidity or elasticity of the wiper strip.

Next, an embodiment of the wiper blade according to the present invention will be described.

<An Embodiment of the Wiper Blade According To the Present Invention>

Figure 6:
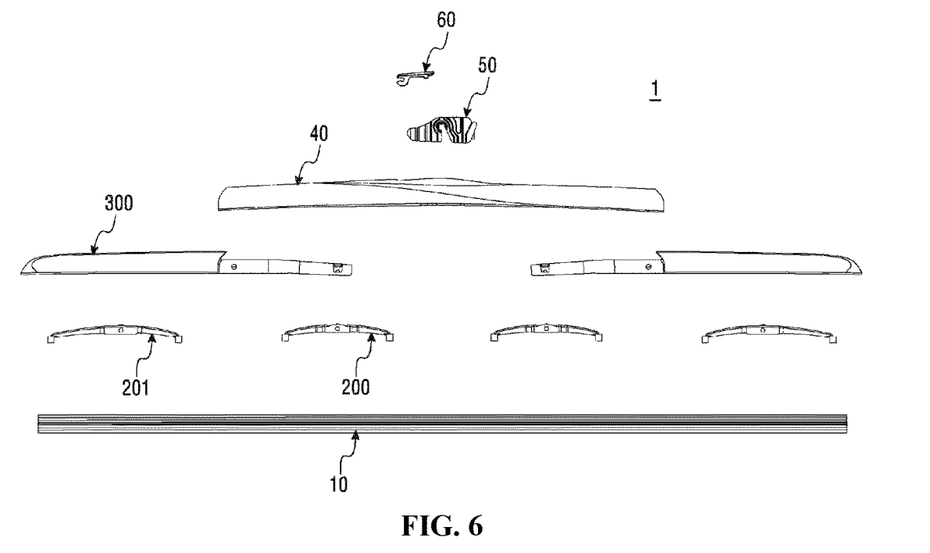
FIG. 6 is an exploded front view of the wiper blade according to the embodiment of the present invention.
Figure 7:
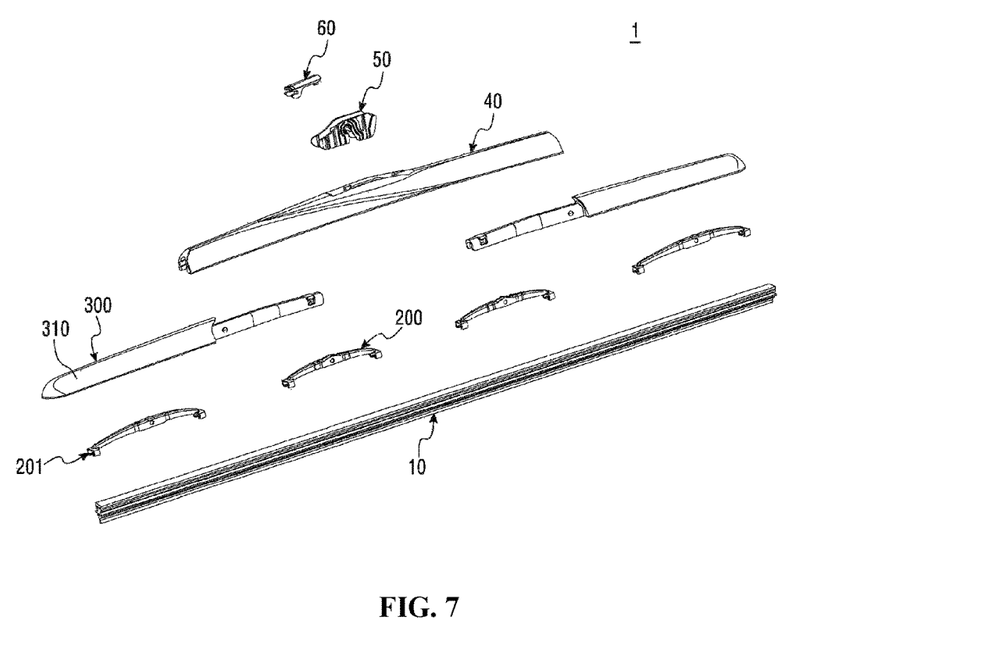
FIG. 7 is an exploded perspective view of the wiper blade according to the embodiment of the present invention.

FIGS. 6 and 7 are an exploded front view and an exploded perspective view respectively of the wiper blade according to the embodiment of the present invention.

Referring to FIGS. 6 and 7, the main lever 40 applies the pressing force applied from the wiper arm (not shown) to the auxiliary lever 300. The auxiliary lever 300 applies at least a portion of the pressing force to the first and second yoke levers 200 and 201. The auxiliary lever 300 and the first and second yoke levers 200 and 201 press the wiper strip 10, thereby allowing the wiper strip 10 to stably wipe the glass surface of the vehicle.

Figure 8A:
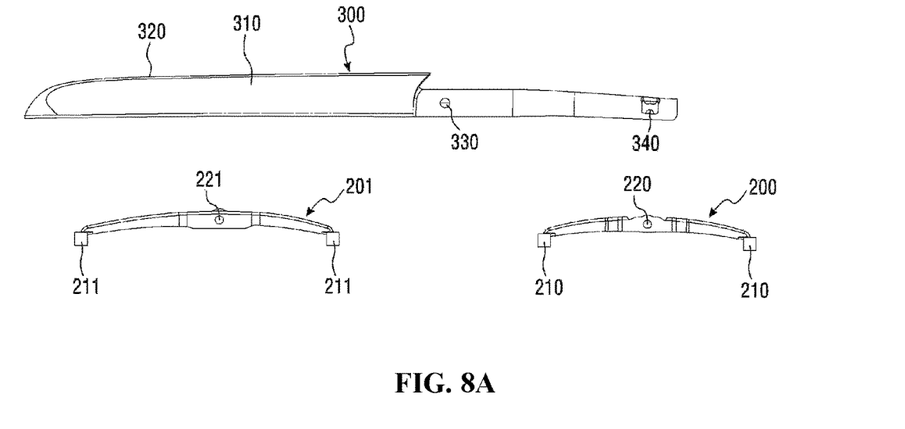
FIG. 8a is an exploded view showing an auxiliary lever and a yoke lever according to the embodiment of the present invention.
Figure 8B:
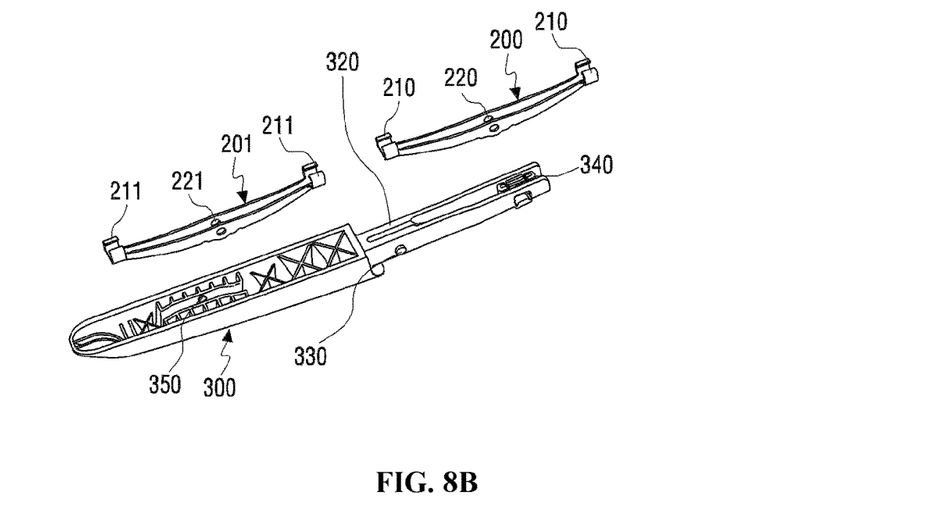
FIG. 8b is a rear perspective view showing the auxiliary lever and the yoke lever according to the embodiment of the present invention.
Figure 9:
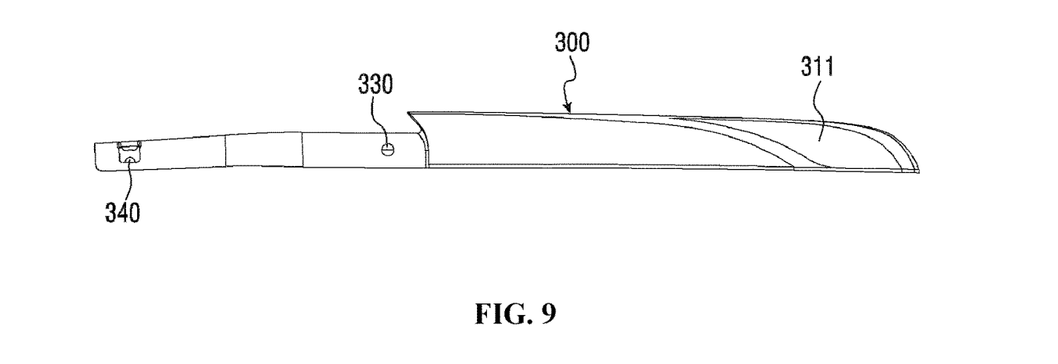
FIG. 9 is a rear view of the auxiliary lever according to the embodiment of the present invention.

FIG. 8a is an exploded view showing the auxiliary lever and the yoke lever according to the embodiment of the present invention. FIG. 8b is a rear perspective view showing the auxiliary lever and the yoke lever according to the embodiment of the present invention. FIG. 9 is a rear view of the auxiliary lever according to the embodiment of the present invention.

As shown in FIGS. 6 to 9, the first and second yoke levers 200 and 201 press the wiper strip 10 and support the wiper strip 10 in such a manner as to be slidable. The first yoke lever 200 may include a first catching recess 220 and a pair of yokes 210, and the second yoke lever 201 may include a second catching recess 221 and a pair of yokes 211. Also, though not shown in the drawings, a receiving hole to be coupled to the auxiliary lever 300 may be formed in an upper central portions of the first yoke lever 200 and the second yoke lever 201 respectively. The first yoke lever 200 may be disposed apart from the end of the wiper strip 10 toward the center of the wiper strip 10, and the second yoke lever 201 may be disposed on an end of the wiper strip 10. The first and second yoke levers 200 and 201 may be made of a resin material and may be manufactured by an injection molding method.

The first and second catching recesses 220 and 221 of the first and second yoke levers 200 and 201 may be formed on the sides of the first and second yoke levers 200 and 201 respectively. The first and second catching recesses 220 and 221 may be formed concave in a direction of the width of the first and second yoke levers 200 and 201. Below-described catching protrusions 340 and 350 of the auxiliary lever 300 are coupled to the first and second catching recesses 220 and 221. The auxiliary lever 300 may perform a relative rotation with the first yoke lever 200 about an axis of the first catching recess 220, and the auxiliary lever 300 may perform a relative rotation with the second yoke lever 201 about an axis of the second catching recess 221.

The pair of the yokes 210 and 211 may be formed at both ends of the first and second yoke levers 200 and 201 respectively. The yokes 210 and 211 may support the wiper strip 10 in such a manner as to be slidable.

The receiving hole may be formed on the upper surface of each of the first and second yoke levers 200 and 201. A protruding fitting portion to be described below of the auxiliary lever 300 may be inserted into the receiving holes of the first and second yoke levers 200 and 201 respectively. When the protruding fitting portion is inserted into the receiving holes of the first and second yoke levers 200 and 201, a gap between the auxiliary lever 300 and the first and second yoke levers 200 and 201 is reduced and torsional flow is prevented at the time of wiping. The resin-made wiper blade 1 is light and is easy to manufacture but has lower rigidity than that of a metallic wiper blade. In the wiper blade 1 according to the embodiment of the present invention, the protruding fitting portion of the auxiliary lever 300 is inserted into the receiving holes of the first and second yoke levers 200 and 201. As a result, in the wiper blade 1 according to the embodiment of the present invention, when the wiping is performed, a resistance to a bending moment and a torsional moment which are applied to the coupling portion of the two levers is increased. There is also an effect that the gap between the two levers is reduced. A cross section as viewed from the top of the receiving hole has a quadrangular shape. However, the shape of the cross section of the receiving hole is not necessarily limited to this and may have various shapes.

As shown in FIGS. 6 to 9, the auxiliary lever 300 transfers the pressing force applied from the main lever 40 to the wiper strip 10 and the first and second yoke levers 200 and 201. The auxiliary lever 300 may include a second side fin 310, a first side fin 311, an extension part 315, an upper edge 320, a first hinge shaft 330, a catching protrusion 340, and a second hinge shaft (not shown). The auxiliary lever 300 may be made of a resin material and may be manufactured by an injection molding method.

The second side fin 310 is integrally formed with a portion of the auxiliary lever 300. The second side fin 310 may be implemented by processing the shape of the outer surface of the auxiliary lever 300. When the wiping is performed, the second side fin 310 induces air such that the air flowing toward the glass surface of the vehicle presses the auxiliary lever 300 in a direction closer to the glass surface of the vehicle.

The extension part 315 is received within the lower portion of the main lever 40 and coupled to the first yoke lever 200 in such a manner as to perform a relative rotation with the first yoke lever 200. The first hinge shaft 330 may be formed on the outer surface of the extension part 315 and functions as a rotational axis at the time of performing a relative rotation with the main lever 40. The second hinge shaft (not shown) may be formed within the extension part 315. The first hinge shaft 330 and the second hinge shaft (not shown) may be coupled to a first and second hinge recesses (not shown) formed inside the main lever 40. Particularly, the first hinge shaft 330 may be tapered such that the degree of protrusion of at least a portion of the first hinge shaft 330 gradually increases or decreases. Therefore, since the first hinge shaft 330 may be coupled up and down in a sliding manner to the first hinge recess (not shown) to be described below of the main lever 40, assemblability is improved.

The lower inside of the second side fin 310 of the auxiliary lever 300 may be open to receive the second yoke lever 201. The protrusion 350 to be coupled to the second yoke lever 201 may be formed in the lower inside of the spoiler of the auxiliary lever 300. The protrusion 350 is caught by and coupled to a catching recess 221 formed in the side of the second yoke lever 201. The pair of the first yoke levers 200 and the pair of the second yoke levers 201 support four points of the wiper strip 10 respectively, and totally support eight points of the wiper strip. The first and second yoke levers 200 and 201 press the eight points of the wiper strip 10, thereby allowing the wiper strip 10 to stably wipe the glass surface of the vehicle. In other words, with the increase of the size or curvature of the glass surface of the vehicle, the two pairs of the yoke levers support and press the eight points of the wiper strip 10. Accordingly, it is possible to more stably and evenly press the wiper strip than the wiper blade having a six-point support structure. However, the auxiliary lever and the yoke lever according to the embodiment of the present invention are not necessarily limited to the eight-point support structure and can be applied to a wiper blade having the six-point support structure in which the pair of the auxiliary levers support two points and the pair of the yoke levers support four points.

Figure 10:
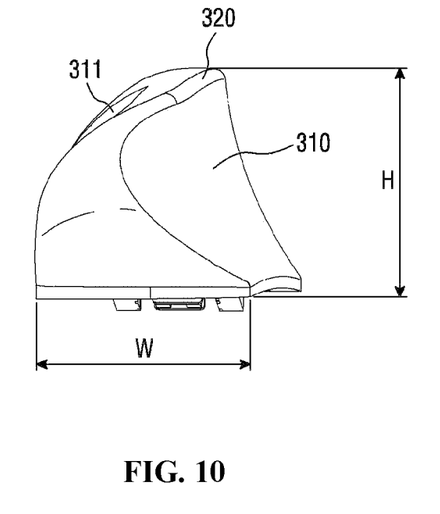
FIG. 10 is a left side view of the auxiliary lever according to the embodiment of the present invention.
Figure 11:
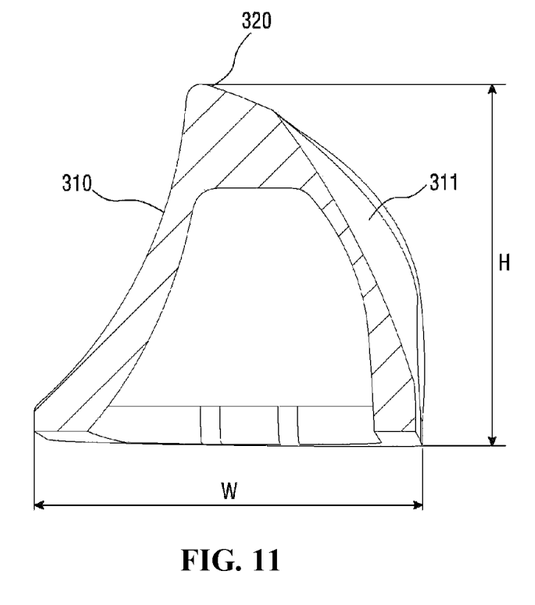
FIG. 11 is a cross sectional view of the wiper blade of FIG. 1 taken along line VA.

FIG. 10 is a left side view of the auxiliary lever according to the embodiment of the present invention. FIG. 11 is a cross sectional view of the wiper blade of FIG. 1 taken along line VA.

Referring to FIGS. 6 to 11, the pair of the auxiliary levers 300 of the wiper blade 1 according to the embodiment of the present invention may include the upper edge 320 and the second side fin 310 which is formed concave on at least a portion of the front side of the auxiliary lever 300 with respect to the upper edge 320 and is integrally formed with the auxiliary levers 300 respectively.

As shown in FIGS. 10 and 11, the height "H" of the auxiliary lever 300 may be formed greater than the width "W" of the lower portion of the auxiliary lever 300.

The height "H" of the auxiliary lever 300 is greater than the width "W" of the lower portion of the auxiliary lever 300 throughout almost the entire area of the auxiliary lever 300. Specifically, in an area between the longitudinal center of the wiper blade 1 and the yoke which is the closest to the end of the wiper blade 1, the height "H" of the auxiliary lever 300 may be greater than the width "W" of the lower portion of the auxiliary lever 300. Here, as shown in FIG. 8a, in the wiper blade having the eight-point support structure, the yoke which is the closest to the end of the wiper blade 1 may be the yoke 211 of the end of the second yoke lever 201. Also, in the wiper blade having the six-point support structure, the yoke which is the closest to the end of the wiper blade may be the yoke formed in the auxiliary lever 300. Therefore, the height of the second side fin 310 formed on the auxiliary lever 300 is maintained toward the end of the auxiliary lever 300. Accordingly, in the wiper blade 1 according to the embodiment of the present invention, the pressing force to the wiper strip 10 by the traveling wind is not reduced significantly toward the end of the wiper blade 1.

Also, as shown in FIGS. 3, 4, 10 and 11, the pair of the auxiliary levers 300 according to the embodiment of the present invention may include the first side fin 311 which is formed concave on at least a portion of the rear side of the auxiliary lever 300 with respect to the upper edge 320 and is integrally formed with the auxiliary levers 300 respectively. Since the first side fin 311 is formed on the rear side of the auxiliary lever 300, there is an effect that the pressing force caused by the air which is applied to the rear of the vehicle in the traveling wind by turbulence is applied to the wiper strip 10. Specifically, the first side fin 311 may be formed on the end of the auxiliary lever 300. Therefore, the pressing force can be added to the end of the wiper blade 1, which receives a pressing force relatively less than the pressing force applied to the central portion of the wiper blade 1.

Both ends of the main lever 40 are connected the pair of the auxiliary levers 300. The main lever 40 applies the pressing force applied from the wiper arm (not shown) to the auxiliary lever 300. The main lever 40 may include a central fin 410 formed on at least a portion of the upper portion of the main lever 40. Also, though not shown in the drawing, the main lever 40 may include an arm coupling hole and may include the first hinge recess, the protruding fitting portion, the second hinge recess, a rib receiving recess, an inner rib, and a concave and convex structure, etc., which are for the coupling to the auxiliary lever 300. The main lever 40 may be made of a resin material and may be manufactured by an injection molding method.

The main lever 40 may include an upper edge 420 and the central fin 410 which is formed overall concave and is integrally formed with the main lever 40. The central fin 410 is integrally formed with the upper surface of the main lever 40. The central fin 410 may be implemented by processing the shape of the upper surface of the main lever 40. When the wiping is performed, the central fin 410 induces air such that the air flowing toward the glass surface of the vehicle presses the main lever 40 in a direction closer to the glass surface of the vehicle.

The arm coupling hole (not shown) to which the wiper arm is coupled is formed in the longitudinal central portion of the main lever 40. A central shaft traversing the arm coupling hole in the width direction of the arm coupling hole may be formed in the arm coupling hole. An adaptor 50 which is directly connected to the wiper arm (not shown) may be assembled to the central shaft. Meanwhile, a cover member 60 may be coupled to the arm coupling hole. A coupling hole to which a pin-type wiper arm may be coupled may be formed on the outside of the main lever 40.

Hereafter, a coupling relation between the main lever and the auxiliary lever will be described.

Referring to FIGS. 6 to 11, the bottom surface of the main lever 40 is open and is able to receive the extension part 315 of the auxiliary lever 300. Both ends of the main lever 40 are able to perform a relative rotation with the auxiliary lever 300 and are separably coupled to the auxiliary lever 300. Specifically, the first and second hinge recesses may be formed in the main lever 40. The above-mentioned first hinge shaft 330 and the second hinge shaft (not shown) of the auxiliary lever 300 may be coupled in an oblique up and down direction in a sliding manner to the first and second hinge recesses.

As shown in FIGS. 1 to 9, the end of the main lever 40 of the wiper blade 1 of the present invention may be formed to have a convex circular shape toward the end of the wiper blade 1. The end of the second side fin 310 of the auxiliary lever 300, which is closer to the main lever 40, may be formed to have a concave circular shape toward the end of the wiper blade 1. The center of the curvature of at least a portion of the circular end of the main lever 40 is the same as that of at least a portion of the circular end of the second side fin 310 of the auxiliary lever 300. Also, the centers of the curvature of the two circular ends may coincide with the first hinge shaft 330 and the second hinge shaft (not shown). Therefore, when the main lever 40 and the auxiliary lever 300 are coupled to each other in the up and down direction perpendicular to the longitudinal direction of the wiper blade 1, the upper edge of the auxiliary lever 300 causes interference with the lower end of the main lever 40. Accordingly, in the wiper blade 1 of the present invention, the auxiliary lever 300 and the main lever 40 are coupled to each other in the oblique up and down direction in a sliding manner.

Without a separate member of a spacer that is inserted between the main lever 40 and the auxiliary lever 300 for the coupling of the two levers, the two levers can be simply assembled in a sliding manner. The first hinge shaft 330 and the second hinge shaft (not shown) function as an axis of the relative rotation of the main lever 40 and the auxiliary lever 300.

Up to now, the foregoing has described the wiper blade 1 having the eight-point support structure. However, it can be considered that the wiper blade according to the embodiment of the present invention is applied to the wiper blade having the six-point support structure including the pair of the auxiliary levers and the pair of the yoke levers.

Specifically, the pair of the yoke levers may support four points of the wiper strip, and the pair of the auxiliary levers may support two points of both ends of the wiper strip.

The yoke may be formed at one end of the auxiliary lever and may allow the one end of the auxiliary lever to support the one end of the wiper strip in such a manner as to be slidable. Also, the catching protrusion is formed on the other end of the auxiliary lever and may be coupled to the yoke lever such that the other end of the auxiliary lever performs a relative rotation with the yoke lever. Since this six-point support structure has been widely known, a detailed description thereof will be omitted.

However, the second side fin and the first side fin may be also formed on the auxiliary lever of the wiper blade having the six-point support structure according to the embodiment of the present invention. Also, in an area between the yoke of the auxiliary lever and the longitudinal center of the wiper blade, the height of the auxiliary lever may be greater than the width of the lower portion of the auxiliary lever.

Consequently, the wiper blade 1 according to the embodiment of the present invention includes one main lever 40, a pair of the auxiliary levers 300, and at least one pair of the yoke levers 200 and 201. All the levers are made of a resin material, respectively. Also, since the height of the side fin is maintained almost constant without being significantly reduced toward the end of the wiper blade 1, there is an effect of sufficiently pressing the end of the wiper strip 10.

According to the embodiment of the present invention, the levers which may be commonly made of a metallic material are made of a resin material, thereby reducing the total weight of the wiper blade 1.

When the levers are made of a resin material instead of a metallic material, the product can be integrally molded, and then the number of parts can be reduced. Accordingly, the process becomes simpler and manufacturing cost is reduced.

Particularly, without a separate member of the spacer that is inserted between the main lever 40 and the auxiliary lever 30, the wiper blade 1 is assembled by using the recess and the catching structure of the protrusion. As a result, the number of the parts can be reduced and the wiper blade can be more simply assembled.

Also, since the levers are made of a resin material, the flexibility of the external appearance of the wiper blade 1 can be increased.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A wiper blade which is coupled to a vehicle and wipes a glass surface of the vehicle, the wiper blade comprising:
    a main lever which is connected to a wiper arm;
    a pair of auxiliary levers which are coupled to the main lever in such a manner as to perform a relative rotation with the main lever;
    at least one pair of yoke levers and which are coupled to the pair of auxiliary levers respectively in such a manner as to perform a relative rotation with the auxiliary lever; and
    a wiper strip which is supported by the at least one pair of yoke levers,
    wherein the pair of auxiliary levers comprises a first side fin which is formed concave on an end of a rear side of the auxiliary lever with respect to an upper edge and is integrally formed with each of the pair of auxiliary levers and a second side fin which is formed on a front side of the auxiliary lever and is integrally formed with each of the pair of auxiliary levers,
    wherein the yoke levers comprise yokes,
    wherein, in an area between a longitudinal center of the wiper blade and the yoke formed at the yoke lever which is closest to an end of the wiper blade, a height of the auxiliary lever is greater than a width of a lower portion of the auxiliary lever;

wherein an end of the main lever is formed to have a convex circular shape toward an end of the wiper blade, wherein an end of the second side fin, which is closer to the main lever, is formed to have a concave circular shape toward the end of the wiper blade, and wherein a center of a curvature of at least a portion of the circular end of the main lever is the same as that of at least a portion of the circular end of the second side fin.

2. The wiper blade of claim 1, wherein the main lever comprises central fins which are formed on at least a portion of the upper portion of the main lever and are integrally formed with the main lever.

3. A wiper blade which is coupled to a vehicle and wipes a glass surface of the vehicle, the wiper blade comprising:
a main lever which is connected to a wiper arm;
a pair of auxiliary levers which are coupled to the main lever in such a manner as to perform a relative rotation with the main lever;
at least one pair of yoke levers and which are coupled to the pair of auxiliary levers respectively in such a manner as to perform a relative rotation with the auxiliary lever; and
a wiper strip which is supported by the at least one pair of yoke levers, wherein the pair of auxiliary levers comprises a first side fin which is formed concave on an end of a rear side of the auxiliary lever with respect to an upper edge and is integrally formed with each of the pair of auxiliary levers and a second side fin which is formed on a front side of the auxiliary lever and is integrally formed with each of the pair of auxiliary levers, wherein the auxiliary lever comprises yokes, wherein, in an area between a longitudinal center of the wiper blade and the yoke formed at the auxiliary lever which is closest to an end of the wiper blade, a height of the auxiliary lever is greater than a width of a lower portion of the auxiliary lever;

wherein an end of the main lever is formed to have a convex circular shape toward an end of the wiper blade, wherein an end of the second side fin, which is closer to the main lever, is formed to have a concave circular shape toward the end of the wiper blade, and wherein a center of a curvature of at least a portion of the circular end of the main lever is the same as that of at least a portion of the circular end of the second side fin.

\* \* \* \* \*